United States Patent
Wadsworth (10) Patent No.: US 12,240,191 B2
(45) Date of Patent: Mar. 4, 2025

(54) SYSTEM AND METHOD FOR PROMOTING INTER-PLY SLIPPAGE

(71) Applicant: Spirit AeroSystems, Inc., Wichita, KS (US)

(72) Inventor: Mark Anthony Wadsworth, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 18/363,024

(22) Filed: Aug. 1, 2023

(65) Prior Publication Data
US 2023/0373172 A1 Nov. 23, 2023

Related U.S. Application Data

(62) Division of application No. 17/577,283, filed on Jan. 17, 2022, now Pat. No. 11,752,711.

(60) Provisional application No. 63/138,609, filed on Jan. 18, 2021.

(51) Int. Cl.
*B29C 70/56* (2006.01)
*B29C 70/44* (2006.01)
*B29C 70/54* (2006.01)

(52) U.S. Cl.
CPC .......... *B29C 70/56* (2013.01); *B29C 70/446* (2013.01); *B29C 70/541* (2013.01); *B29C 70/543* (2013.01)

(58) Field of Classification Search
CPC ....... B29C 70/56; B29C 70/388; B29C 70/30; B29C 55/023; B29C 55/02; B29C 70/541; B29C 70/543; B29C 2053/8025
See application file for complete search history.

(56) References Cited

U.S. PATENT DOCUMENTS

| | | | | |
|---|---|---|---|---|
| 2,918,696 A | * | 12/1959 | Bottoms | B29C 55/10 425/DIG. 53 |
| 2,934,317 A | * | 4/1960 | Warnken | B29D 99/0025 416/248 |
| 3,466,706 A | * | 9/1969 | Kazuo | C08J 3/00 425/398 |
| 5,026,514 A | * | 6/1991 | Hauwiller | B29D 99/0003 264/258 |

(Continued)

OTHER PUBLICATIONS

International Preliminary Report on Patentability in related PCT Application PCT/US2022/012709 mailed Jul. 27, 2023, 7 pages.

(Continued)

*Primary Examiner* — Matthew J Daniels
(74) *Attorney, Agent, or Firm* — Stinson LLP (57) ABSTRACT

A composite part forming system for shaping a composite material blank having a plurality of plies, the composite part forming system comprising opposing tools including shape-forming features, an actuator, and a composite tensioning system. The composite tensioning system is connectable to a periphery of the composite material blank to apply tension to the composite material blank the first and second tools are moved together to cause the composite material blank to conform to the shape-forming features. The composite tensioning system is configured to apply more tension to wrinkle prone plies of the composite material blank than to non-wrinkle prone plies as the composite material blank is caused to conform to the shape-forming features.

18 Claims, 3 Drawing Sheets

(56) References Cited

U.S. PATENT DOCUMENTS

| | | | |
|---|---|---|---|
| 6,981,863 B2 | 1/2006 | Renault et al. | |
| 7,708,546 B2 | 5/2010 | Lee et al. | |
| 8,162,652 B2 | 4/2012 | Marengo et al. | |
| 9,573,301 B2 | 2/2017 | Kline et al. | |
| 10,786,953 B2 | 9/2020 | Wadsworth | |
| 2010/0263789 A1* | 10/2010 | Graber | B29C 70/56 |
| | | | 156/228 |
| 2012/0312459 A1* | 12/2012 | De Mattia | B29C 70/30 |
| | | | 156/481 |
| 2013/0101694 A1* | 4/2013 | Theinert | B29B 11/16 |
| | | | 425/383 |
| 2013/0175723 A1* | 7/2013 | Luebbering | B29C 51/16 |
| | | | 425/112 |
| 2014/0035195 A1* | 2/2014 | Gottinger | B29C 70/541 |
| | | | 264/258 |
| 2018/0370072 A1* | 12/2018 | Pfaff | B28B 23/0006 |
| 2020/0016797 A1* | 1/2020 | Chapman | B29C 70/541 |
| 2020/0346419 A1* | 11/2020 | Rigamonti | B29C 37/001 |

OTHER PUBLICATIONS

International Search Report and Written Opinion dated May 11, 2022 for related PCT Patent Application No. PCT/US2022/012709 which was filed on Jan. 18, 2022; 11 pages.

* cited by examiner

SYSTEM AND METHOD FOR PROMOTING INTER-PLY SLIPPAGE

RELATED APPLICATIONS

The present non-provisional patent application is a divisional, and claims priority benefit with regard to all common subject matter, of prior-filed U.S. non-provisional patent application Ser. No. 17/577,283, filed Jan. 17, 2022, titled SYSTEM AND METHOD FOR PROMOTING INTER-PLY SLIPPAGE. Application Ser. No. 17/577,283 claims priority benefit of prior-filed US provisional patent application Serial Application No. 63/138,609, filed Jan. 18, 2021, titled SYSTEM AND METHOD FOR PROMOTING INTER-PLY SLIPPAGE. The above-referenced prior-filed patent applications are hereby incorporated by reference into the present patent application in their entireties.

BACKGROUND

Stamp forming is often used for rapid manufacturing of thermoplastic composite laminates, and drape forming is often used to rapidly layup thermosetting composites. In both applications, as part thickness increases, bend radius decreases, or angle of bending increases, the composites become prone to wrinkling on concave sides and bridging on convex sides of the formed part. Such wrinkling and bridging are considered rejectable conditions for aerospace parts.

Wrinkling is reduced by tensioning a part blank with springs or retainers attached via holes in manufacturing excess of the part blank. For example, knotted wire or clevis type clips pull on the entire thickness of the part blank. This reduces the ability of the part blank to "book" at the edge of the laminate. Booking is necessary to avoid wrinkling or bridging in bend regions due to the differing path lengths through the thickness after forming.

Complex, multi-piece tooling with side action can be used to minimize wrinkling and bridging by incorporating moving tool segments to strategically time laminate compaction. For example, pressure may be applied in a sequence that promotes inter-ply slippage while keeping molten material in tension to avoid wrinkling. This can be expensive, may require more maintenance than simple two-piece tooling, and may require extensive experience to design and operate properly.

SUMMARY

Embodiments of the invention solve the above-mentioned problems and other problems and provide a distinct advancement in the art of composite part forming systems. More particularly, the invention provides a composite part forming system that promotes inter-ply slippage between plies of a composite material blank.

An embodiment of the composite part forming system broadly comprises a female tool, an actuator, a male tool, and composite material tensioning system. The composite material tensioning system induces more tension to some of the plies depending on whether those plies are wrinkle prone or not.

The female tool includes concave radiused inner corners and convex radiused lead corners. The female tool is formed of a substantially rigid material configured for supporting composite material during layup and prior to and/or during curing.

The actuator is configured to urge the male tool and female tool together. In one embodiment, the actuator supports or suspends the male tool above the female tool and actuates the male tool downward toward the female tool.

The male tool includes convex radiused inner corners and concave radiused lead corners. The male tool is formed of substantially rigid material configured for shaping the composite material during layup and prior to and/or during curing.

The tensioning system comprises opposing first and second clevises and opposing first and second clevis pins. The tensioning system may also include biasing members (e.g., springs), cables, linkages, or similar components for applying tension in the composite material.

The first clevis is U-shaped or C-shaped and includes opposing holes for receiving the first clevis pin therethrough. The opposing holes loosely align with a tension hole in excess manufacturing portions of the composite material. The opposing holes are offset from each other in the direction of applied tension so that the first clevis pin is oriented at a non-perpendicular angle in the tension hole relative to the plies.

The first clevis pin is configured to be inserted through the opposing holes and tension hole to link the first clevis to the composite material. The first clevis pin is also configured to be oriented diagonally through the tension hole due to the offset positioning of the opposing holes.

The second clevis is U-shaped or C-shaped and includes opposing holes for receiving the second clevis pin therethrough. The opposing holes align with another tension hole in excess manufacturing portions of the composite material opposite the tension hole. Unlike the opposing holes of the first clevis, the opposing holes of the second clevis may be axially aligned so that the second clevis pin is perpendicular to the direction of applied tension. Alternatively, the opposing holes of the second clevis may be offset from each other similar to the opposing holes of the first clevis.

The second clevis pin may be substantially similar to the first clevis pin. The second clevis pin is configured to extend through the opposing holes of the second clevis and the tension hole of the composite material.

In use, the clevises are positioned at certain locations along the periphery of the composite material with the opposing holes of the clevises aligned with the tension holes of the composite material. The clevis pins are inserted into the opposing holes of the clevises and through the tension holes of the composite material.

The clevises are then pulled in opposite directions from each other to induce tension in plies of the composite material via the clevis pins. The clevis pins induce more tension to some of the plies depending on whether those plies are wrinkle prone or not (based on their position in the completed part). In this case, the upper plies are more susceptible to wrinkling due to their closer proximity to the male tool and thus are engaged with more tension by the diagonally oriented clevis than the lower plies.

The male tool is then moved by the actuator toward the female tool until the male tool and female tool are fully engaged with each other. The composite material complies with shape-forming features of the male tool and female tool so that the composite material takes a desired shape when the male tool and female tool are fully engaged with each other. The clevis pins may pull through the composite material when tension exceeds bearing strength of the composite material.

The above-described composite part forming system provides several advantages. For example, plies of the composite material that are on the inside of a bend (and thus are more susceptible to wrinkling) are stretched under more tension than plies in the middle or on the outside of the bend. This difference in tension endured by adjacent plies promotes inter-ply slippage, which prevents wrinkling and bridging.

The composite part forming system can be used in aircraft production, automobile production, and other applications that use thermoplastic composite stamp forming, thermosetting laminate hot drape forming, and the like. The composite part forming system also reduces scrap.

Another embodiment is a composite tensioning system broadly comprising a clevis and clevis pin in which the clevis is U-shaped or C-shaped and includes opposing holes that are aligned with each other for receiving the clevis pin perpendicularly therethrough.

The clevis pin is configured to extend perpendicularly through the aligned opposing holes and a tension hole of composite material. The tension hole is tapered on its outer side. That is, outer edges of the tension hole are initially closer to the clevis pin in plies that are more susceptible to wrinkling and farther away in plies that are less susceptible to wrinkling. To that end, the tension hole may be machined to a desired shape.

In use, the clevis pin induces more tension to some of the plies depending on whether those plies are wrinkle prone or not (based on their position in the completed part). In this case, the upper plies are more susceptible to wrinkling due to their closer proximity to the male tool and thus are engaged with more tension by the clevis pin than the lower plies according to the tapered outer sides of the tension holes. This difference in tension endured by adjacent plies promotes inter-ply slippage, which prevents wrinkling and bridging.

Another embodiment is a composite tensioning system broadly comprising a clevis and clevis pin in which the clevis is U-shaped or C-shaped and includes opposing holes that have different dimensions to accommodate the clevis pin. For example, one hole may have a relatively larger diameter while the opposing hole may have a relatively smaller diameter.

The clevis pin includes a number of step-down ledges and is configured to be inserted perpendicularly through the opposing holes of the clevis and a tension hole of composite material. The clevis pin thus forms a discrete tapered profile.

The clevis pin induces more tension to some plies of composite material depending on whether those plies are wrinkle prone or not (based on their position in the completed part). In this case, the upper plies are more susceptible to wrinkling due to their proximity to the male tool and thus are engaged with more tension by more prominent step-down ledges of the clevis pin. The lower plies are less susceptible to wrinkling and thus are engaged with less tension by the less prominent step-down ledges of the clevis pin. This difference in tension endured by adjacent plies promotes inter-ply slippage, which prevents wrinkling and bridging. The benefit is further enhanced by the larger engagement area with the higher tension plies since the larger area can provide more tension before the soft surrounding laminate deforms.

Another embodiment is a composite tensioning system broadly comprising and clevis pin in which the clevis is U-shaped or C-shaped and includes a single hole on side of the clevis. The clevis pin is configured to extend cantilever through the hole of the clevis and at least partially through a tension hole of composite material. The clevis pin does not extend fully through the tension hole when fully inserted.

In use, the clevis pin engages only some plies of composite material. In this way, the clevis pin induces more tension to some of the plies depending on whether those plies are wrinkle prone or not (based on their position in the completed part). In this case, the upper plies are more susceptible to wrinkling due to their proximity to the male tool and thus are engaged directly by the clevis pin. The lower plies are only indirectly under tension via the directly-engaged plies. This difference in tension endured by adjacent plies promotes inter-ply slippage, which prevents wrinkling and bridging.

Another embodiment is a composite tensioning system broadly comprising a cantilever pin including a neck and a head. The cantilever pin is configured to be attached to a wire on a distal end of the cantilever pin opposite the head.

The neck is configured to extend through a tension hole of composite material. The head is wider than the neck and is configured to anchor the cantilever pin in the tension hole or prevent the cantilever pin from being pulled through the tension hole.

In use, the wire pulls the cantilever pin via the distal end of the cantilever pin. The cantilever load induces more tension in some of the plies of composite material depending on whether those plies are wrinkle prone or not (based on their position in the completed part). To that end, the cantilever pin may rotate about a midplane. In this case, the upper plies are more susceptible to wrinkling due to their proximity to the male tool and are engaged with more tension by the distal end of the cantilever pin. The lower plies are less susceptible to wrinkling and thus are engaged with less tension by the cantilever pin or may be pushed into forming process. This difference in tension endured by adjacent plies promotes inter-ply slippage, which prevents wrinkling and bridging.

Another embodiment is a hot drape forming system broadly comprising a mold, an inflatable bladder, an actuator, and a composite tensioning system. The composite tensioning system may be substantially similar to one of the composite tensioning systems described previously.

The mold includes convex radiused inner corners and concave radiused lead corners. The mold is formed of substantially rigid material configured for shaping the composite material.

The inflatable bladder is positioned above the composite material opposite the mold and is flexible, malleable, or compliant to shape the composite material around the mold when the inflatable bladder is inflated or actuated (after being inflated) against the mold. The inflatable bladder may have a biasing shape to assist in pressing the composite material along sides of the mold.

The actuator is positioned above the inflatable bladder and is configured to move the inflatable bladder into engagement with the composite material. The actuator may be further configured to compress the inflatable bladder against the mold so the inflatable bladder shapes the composite material around the mold.

The composite tensioning system includes a biasing element, tension wires, and tension connectors (clevises and clevis pins or cantilever pins as described above). The composite tensioning system is configured to induce tension in the composite material as the composite material is draped over the mold via the inflatable bladder.

The biasing elements is configured to exert a tension force on the tension wires and may include springs, weights, pressurized or vacuum systems, or the like. The composite tensioning system is configured to move along the axis of movement of the inflatable bladder (e.g., downward) during forming to more effectively control an amount of tension on the composite material.

The tension wires connect the biasing elements to the composite material via the tension connectors for transferring the tension force from the biasing elements to the composite material. The tension wires are configured to at least partially wrap around the inflatable bladder as the inflatable bladder presses down the sides of the mold.

The tension connectors (clevises and clevis pins or cantilever pins as described above) connect the tension wires to the composite material. The tension connectors are configured to distribute tension to each ply in the composite material according to the ply's susceptibility to wrinkling.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Turning to FIGS. 1-4, a composite part forming system 10 constructed in accordance with an embodiment of the invention is illustrated. The composite part forming system 10 broadly comprises a female tool 12, an actuator 14, a male tool 16, and composite material tensioning system 18.

The female tool 12 may be a mold, layup tool, bladder, or the like and may have concave radiused inner corners 20 and convex radiused lead corners 22. The female tool 16 may be made of a substantially rigid material configured for supporting a composite material blank (e.g., composite material 100) during layup and prior to and/or during curing.

The actuator 14 may be configured to urge the male tool 16 and female tool 12 together. In one embodiment, the actuator 14 supports or suspends the male tool 16 above the female tool 12 and actuates the male tool 16 downward toward the female tool 12.

The male tool 16 may be a mold, layup tool, bladder, or the like and may have convex radiused inner corners 24 and concave radiused lead corners 26. The male tool 16 may be made of a substantially rigid material configured for shaping the composite material 100 during layup and prior to and/or during curing.

The composite material tensioning system 18 broadly comprises opposing first and second clevises 28A, B, and opposing first and second clevis pins 30A, B. Two clevises and two clevis pins are shown, but any number of clevises and clevis pins may be used to apply tension in the composite material 100. The composite material tensioning system 18 may also include biasing members, cables, linkages, or similar components for applying tension in the composite material 100.

The first clevis 28A is U-shaped or C-shaped and includes opposing holes 32A,B for receiving the first clevis pin 30A therethrough. The opposing holes 32A,B loosely align with a tension hole 102 in excess manufacturing portions of the composite material 100. The opposing holes 32A,B may be offset from each other in the direction of applied tension so that the first clevis pin 30A is angled in the tension hole 102.

The first clevis pin 30A is configured to be inserted through the opposing holes 32A,B and tension hole 102 to link the first clevis 28A to the composite material 100. The first clevis pin 30A may be straight and configured to be oriented diagonally through the tension hole 102 due to the offset positioning of the opposing holes 32A,B. Alternatively, the first clevis pin 30A may have an angled, bent, eccentric, tapered, or diagonal shape. The first clevis pin 30A may also include a head or flange for preventing the first clevis pin 30A from completely passing through the first clevis 28A and tension hole 102. The first clevis pin 30A may be configured to be secured to the composite material 100 via linchpin or similar component.

The second clevis 28B is U-shaped or C-shaped and includes opposing holes 34A,B for receiving the second clevis pin 30B therethrough. The opposing holes 32 align with another tension hole in excess manufacturing portions of the composite material 100 opposite the tension hole 102. Unlike the opposing holes 32A,B, the opposing holes 34A,B may be axially aligned so that the second clevis pin 30B is perpendicular to the direction of applied tension. Alternatively, the opposing holes 34A,B may be offset from each other similar to the opposing holes 32A,B.

The second clevis pin 30B may be substantially similar the first clevis pin 30A. The second clevis pin 30B may be configured to extend through the opposing holes 34A,B of the second clevis 28B and the tension hole 102 of the composite material 100. The second clevis pin 30B may be straight or may have an angled, bent, eccentric, or tapered, or diagonal shape.

In use, the clevises 28A,B are positioned at certain locations along the periphery of the composite material 100 with the opposing holes of the clevises 28A,B aligned with the tension holes of the composite material 100. The clevis pins 30A,B are inserted into the opposing holes 32A, B and 34A, B of the clevises 28A, B and through the tension holes of the composite material 100. To that end, the tension holes may be drilled or machined into the composite material 100.

The clevises 28A,B may then be pulled in opposite directions from each other to induce tension in plies 104 of the composite material 100 via the clevis pins 30A,B. Various tensioning arrangements are possible for applying force to each of the clevises 28A,B to pull them in opposite directions. One example of a tensioning arrangement having biasing elements for pulling the clevises in opposite directions is described below in connection with FIG. 5. As another example, a lever may be used to produce shear in the periphery outside of the composite part to enforce the displacement to promote laminate booking. Importantly, the diagonally oriented clevis pin 30A induce more tension to some of the plies depending on whether those plies are wrinkle prone or not (based on their position in the completed part). In the illustrated example, the upper plies are more susceptible to wrinkling and thus are engaged with more tension by the diagonally oriented clevis 28A than the lower plies.

Ply tension may be a function of a ply's position in the composite material 100. For example, a non-curved, diagonal clevis pin may apply linearly decreasing tension from one side of the composite material 100 to the opposing side of the composite material 100. Alternatively, ply tension may increase by larger orders or may increase by a tapered amount.

The male tool 16 may then be moved by the actuator 14 toward the female tool 12 until the male tool 16 and female tool 12 are fully engaged with each other. The composite material 100 complies with shape-forming features of the male tool 16 and female tool 12 so that the composite material 100 takes a desired shape when the male tool 16 and female tool 12 are fully engaged with each other. The clevis pins 30A,B may pull through the composite material when tension exceeds bearing strength of the composite material.

The above-described composite part forming system 10 provides several advantages. For example, plies of the composite material 100 that are on the inside of a bend (and thus are more susceptible to wrinkling) are stretched under more tension than plies in the middle or on the outside of the bend. This difference in tension endured by adjacent plies promotes inter-ply slippage, which prevents wrinkling and bridging.

The composite part forming system 10 can be used in aircraft production, automobile production, and other applications that use thermoplastic composite stamp forming, thermosetting laminate hot drape forming, and the like. The composite part forming system 10 also reduces scrap and tooling costs.

Figure 1:
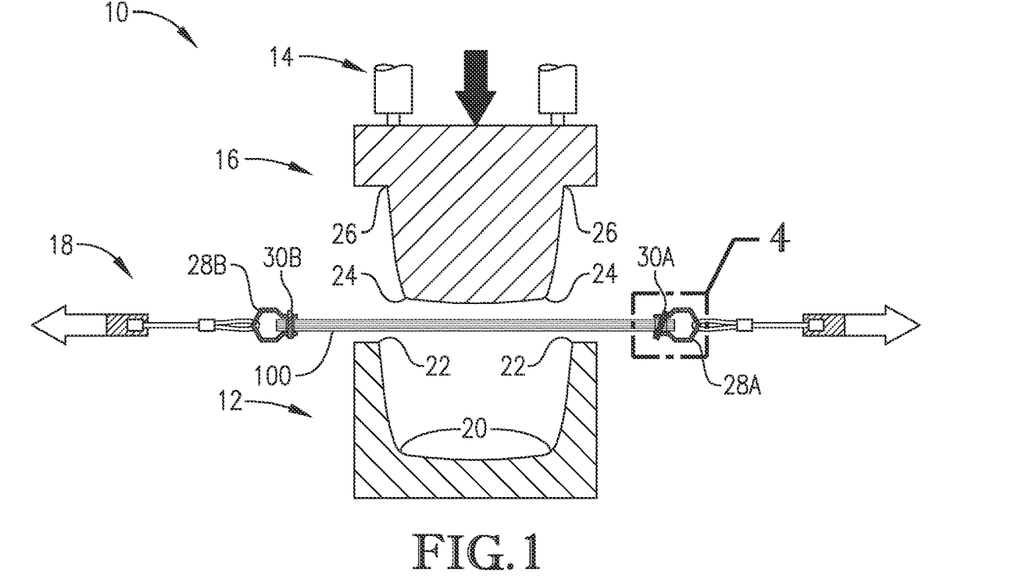
FIG. 1 is an elevation view of a composite part forming system constructed in accordance with an embodiment of the invention.
Figure 2:
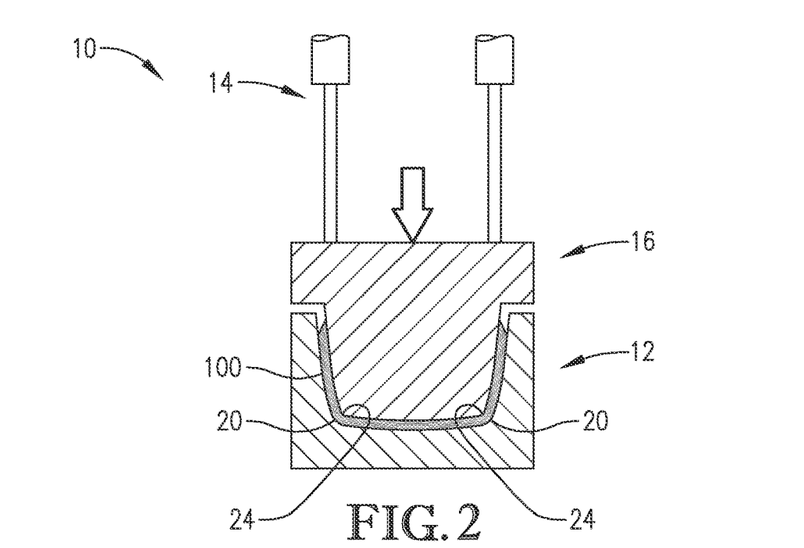
FIG. 2 is another elevation view of the composite part forming system of FIG. 1.
Figure 3:
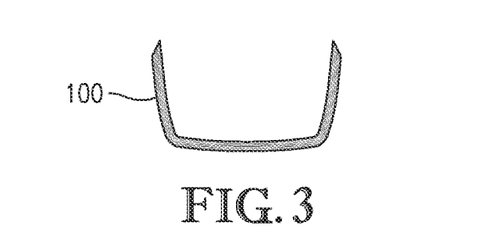
FIG. 3 is an elevation view of a composite part formed by the composite part forming system of FIG. 1.
Figure 4:
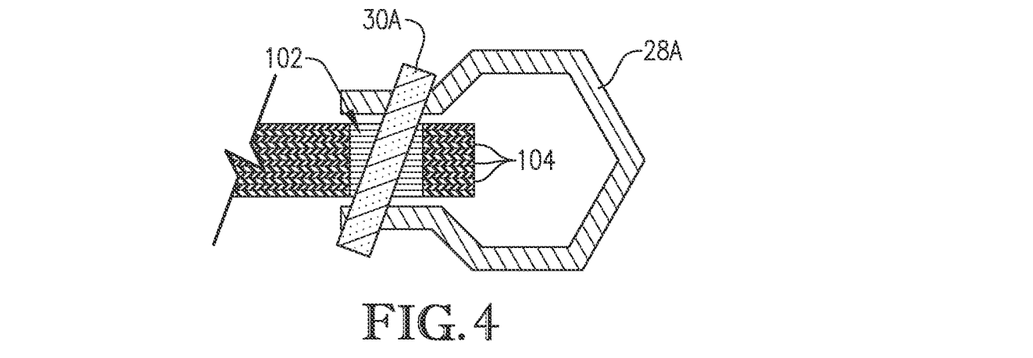
FIG. 4 is an enlarged elevation view of certain components of the composite part forming system of FIG. 1.
Figure 5:
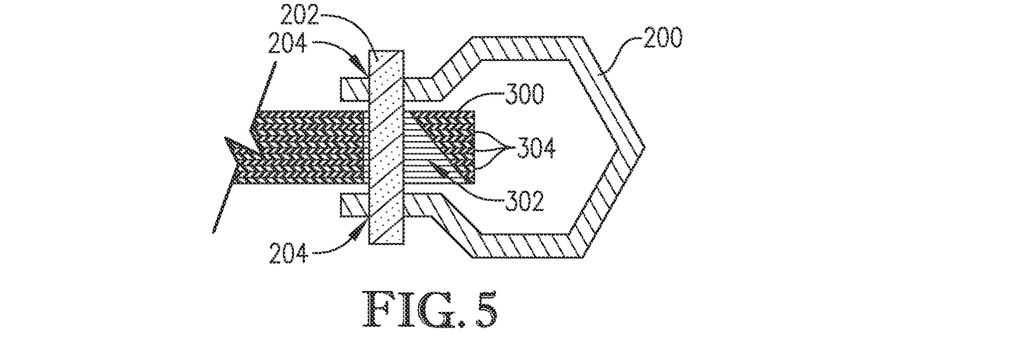
FIG. 5 is an enlarged elevation view of certain components of a composite part forming system constructed in accordance with another embodiment of the invention.

Turning to FIG. 5, a clevis 200 and clevis pin 202 constructed in accordance with another embodiment is illustrated. The clevis 200 may be U-shaped or C-shaped and includes opposing holes 204 that are aligned with each other.

The clevis pin 202 may be configured to extend perpendicularly through the aligned opposing holes 204 and a tension hole 302 of composite material 300. The tension hole 302 may be tapered on its outer side. That is, outer edges of the tension hole 302 are initially closer to the clevis pin 202 in plies that are more susceptible to wrinkling and farther away in plies that are less susceptible to wrinkling. To that end, the tension hole 302 may be machined to a desired shape.

In use, the clevis pin 202 may induce more tension to some of the plies 304 depending on whether those plies are wrinkle prone or not (based on their position in the completed part). In the illustrated example, the upper plies are more susceptible to wrinkling and thus are engaged with more tension by the clevis pin 202 than the lower plies due to the tapered outer sides of the tension holes 302. This difference in tension endured by adjacent plies promotes inter-ply slippage, which prevents wrinkling and bridging.

Figure 6:
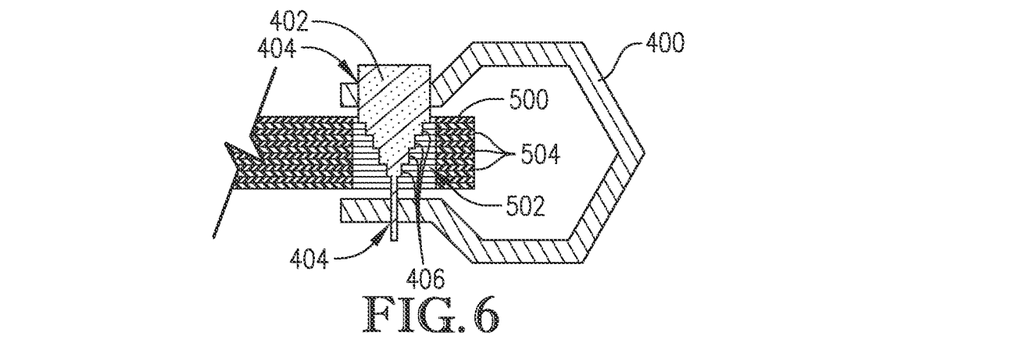
FIG. 6 is an enlarged elevation view of certain components of a composite part forming system constructed in accordance with another embodiment of the invention.

Turning to FIG. 6, a clevis 400 and clevis pin 402 constructed in accordance with another embodiment is illustrated. The clevis 400 may be U-shaped or C-shaped and includes opposing holes 404. The opposing holes 404 may have different dimensions to accommodate the clevis pin 402. For example, one hole may have a relatively larger diameter while the opposing hole may have a relatively smaller diameter.

The clevis pin 402 may include a plurality of step-down ledges 406 and may be configured to be inserted perpendicularly through the opposing holes 404 of the clevis 400 and a tension hole 502 of composite material 500. The clevis pin 402 thus may form a discrete tapered profile.

The clevis pin 402 may induce more tension to some of plies 504 of composite material 500 depending on whether those plies are wrinkle prone or not (based on their position in the completed part). In the illustrated example, the upper plies are more susceptible to wrinkling and thus are engaged with more tension by more prominent ones of the step-down ledges 406 of the clevis pin 402. The lower plies are less susceptible to wrinkling and thus are engaged with less tension by the less prominent ones of the step-down ledges 406 of the clevis pin 402. This difference in tension endured by adjacent plies promotes inter-ply slippage, which prevents wrinkling and bridging.

Figure 7:
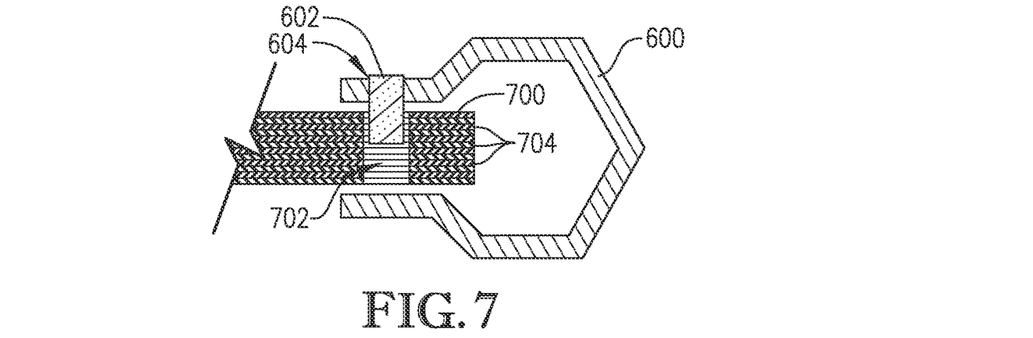
FIG. 7 is an enlarged elevation view of certain components of a composite part forming system constructed in accordance with another embodiment of the invention.

Turning to FIG. 7, a clevis 600 and clevis pin 602 constructed in accordance with another embodiment is illustrated. The clevis 600 may be U-shaped or C-shaped and may include a single hole 604.

The clevis pin 602 is configured to extend cantilever through the hole 604 of the clevis 600 and at least partially through a tension hole 702 of composite material 700. The clevis pin 602 does not extend fully through the tension hole 702 when fully inserted.

In use, the clevis pin 602 may engage only some plies 704 of the composite material 700. In this way, the clevis pin 602 may induce more tension to some of the plies depending on whether those plies are wrinkle prone or not (based on their position in the completed part). In the illustrated example, the upper plies are more susceptible to wrinkling and thus are engaged directly by the clevis pin 602. The lower plies are only indirectly under tension via the directly-engaged plies. This difference in tension endured by adjacent plies promotes inter-ply slippage, which prevents wrinkling and bridging.

Figure 8:
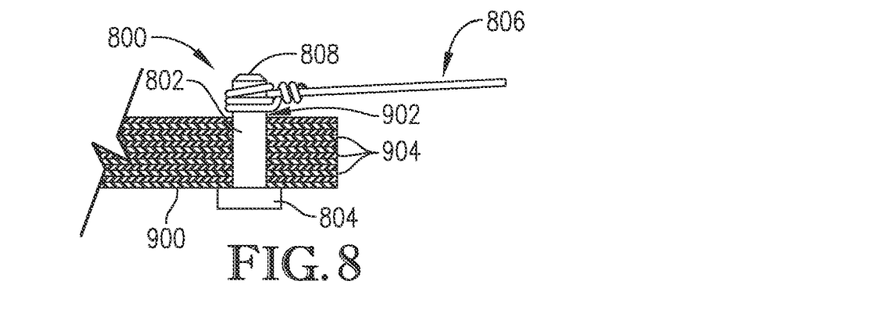
FIG. 8 is an enlarged elevation view of certain components of a composite part forming system constructed in accordance with another embodiment of the invention.

Turning to another embodiment of the invention illustrated in FIG. 8, one or both of the tensioning connectors of a tensioning system may comprise a cantilever pin 800 employed without the clevises used in the prior embodiments. Each cantilever pin 800 may include a neck 802 and a head 804. Each cantilever pin 800 may be attached to a wire 806 on a distal end 808 opposite the head 804.

The neck 802 may be configured to extend through a tension hole 902 of composite material 900. The head 804 may be wider than the neck 802 and may anchor the cantilever pin 800 in the tension hole 902 or prevent the cantilever pin 800 from being pulled through the tension hole 902.

In use, the wire 806 pulls the cantilever pin 800 via the distal end 808 of the cantilever pin 800. The cantilever load may induce more tension in some of the plies 904 of composite material 900 depending on whether those plies are wrinkle prone or not (based on their position in the completed part). To that end, the cantilever pin 800 may rotate about a midplane. In the illustrated example, the upper plies are more susceptible to wrinkling and are engaged with more tension by the distal end 808 of the cantilever pin 800. The lower plies are less susceptible to wrinkling and thus are engaged with less tension by the cantilever pin 800 or may be pushed into forming process. This difference in tension endured by adjacent plies promotes inter-ply slippage, which prevents wrinkling and bridging.

Figure 9:
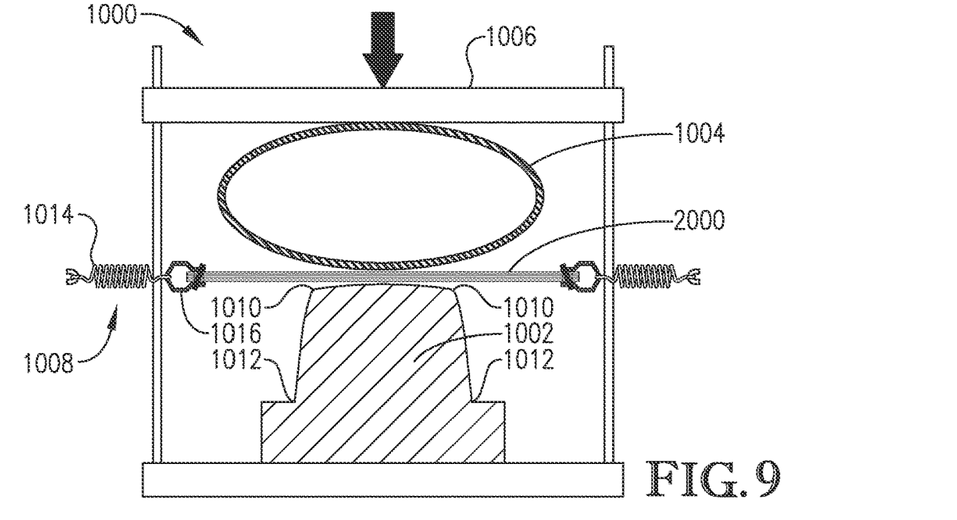
FIG. 9 is an elevation view of a composite part forming system constructed in accordance with another embodiment of the invention.
Figure 10:
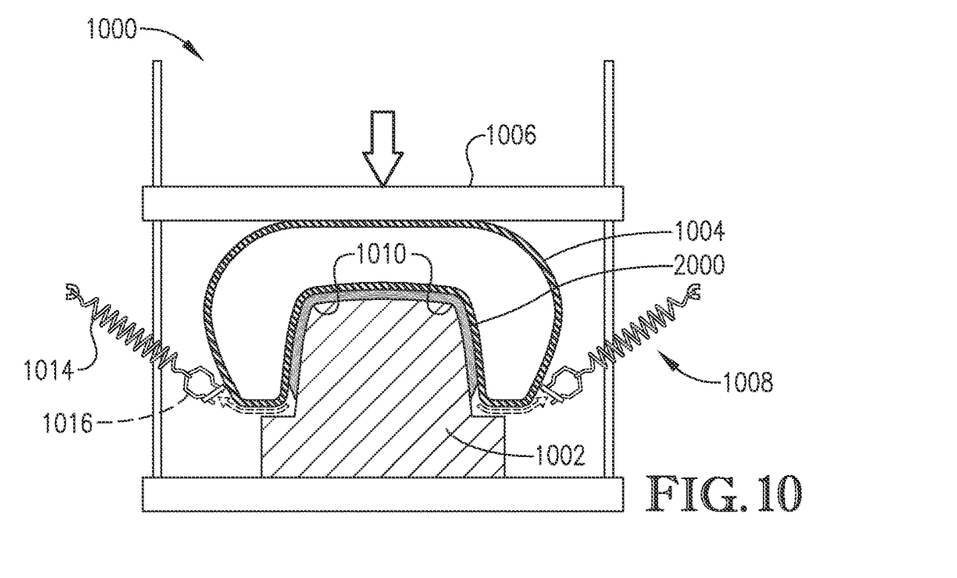
FIG. 10 is another elevation view of the composite part forming system of FIG. 9.

Turning to FIGS. 9 and 10, a hot drape forming system 1000 constructed in accordance with another embodiment is illustrated. The hot drape forming system 1000 broadly comprises a mold 1002, an inflatable bladder 1004, an actuator 1006, and a composite tensioning system 1008. The composite tensioning system 1008 may be substantially similar to the composite material tensioning system 18 described previously, and may likewise include clevises as described in connection with FIGS. 1-4 or a system using a cantilever pin without a clevis, as described in connection with FIG. 5.

The mold 1002 may be a male layup tool, bladder, or the like and may have convex radiused inner corners 1010 and concave radiused lead corners 1012. The mold 1002 may be made of a substantially rigid material configured for shaping the composite material 2000.

The inflatable bladder 1004 may be positioned above the composite material 2000 opposite the mold 1002 and may be flexible, malleable, or compliant to shape the composite material 2000 around the mold 1002 when the inflatable bladder 1004 is inflated. The inflatable bladder 1004 may have a biasing shape to assist in pressing the composite material 2000 along sides of the mold 1002.

The actuator 1006 may be positioned above the inflatable bladder 1004 and may be configured to move the inflatable bladder 1004 into engagement with the composite material 2000. The actuator 1006 may be further configured to compress the inflatable bladder 1004 against the mold 1002 so the inflatable bladder 1004 shapes the composite material 2000 around the mold 1002.

The composite tensioning system 1008 may include a biasing element 1014, optional tension wires, and tension connectors 1016 (clevises and clevis pins or cantilever pins as described above). The composite tensioning system 1008 may be configured to induce tension in the composite material 2000 as the composite material 2000 is draped over the mold 1002 via the inflatable bladder 1004.

The biasing elements 1014 may be configured to exert a tension force on the tension connectors 1016 via the tension wires and may include springs, weights, pressurized or vacuum systems, or the like. The composite tensioning system 1008 may be configured to move along the axis of movement of the inflatable bladder (e.g., downward) during forming to more effectively control an amount of tension on the composite material 2000.

The tension wires may connect the biasing elements 1014 to the composite material 2000 via the tension connectors 1016 for transferring the tension force from the biasing elements 1014 to the composite material 2000. The tension wires may be configured to at least partially wrap around the inflatable bladder 1004 as the inflatable bladder 1004 presses down the sides of the mold 1002.

The tension connectors 1016 (clevises and clevis pins or cantilever pins as described above) may connect the tension wires to the composite material 2000. The tension connectors are configured to distribute tension to each ply in the composite material 2000 according to the ply's susceptibility to wrinkling.

In use, the composite material 2000 may be connected to the tension wires via the tension connectors 1016. Initial tension may be applied to the tension wires to suspend the composite material 2000 above the mold 1002. This may reduce the need for heating the mold 1002 since cooling of the composite material 2000 can be delayed via the suspension. The initial tension may also assist in blank trellising in certain areas of the composite material 2000.

The inflatable bladder 1004 may then be inflated. Alternatively, the inflatable bladder 1004 may be pre-inflated or permanently inflated. The actuator 1006 may also press the inflatable bladder 1004 against the composite material 2000.

The biasing elements 1014 may induce additional tension into the composite material 2000 so that the composite material 2000 is subjected to a forming tension. Furthermore, the biasing elements 1014 and tension wires may be moved to change the origin of the tension force, thereby affecting the direction, intensity, and timing of the tension.

To promote early tensioning in the forming process, the tension wires may be pulled from a position that causes the inflatable bladder 1004 to quickly contact the tension wires. To promote late tensioning, the tension wires may be pulled from a position where the inflatable bladder 1004 does not contact the tension wires until later in the forming process or not at all.

The tension connectors 1016 (clevises and clevis pins or cantilever pins as described above) may induce more tension to some of the plies depending on whether those plies are wrinkle prone or not (based on their position in the completed part). In the illustrated example, the lower plies are more susceptible to wrinkling near the convex radiused inner corners 1010 and thus are engaged with more tension than the upper plies. This difference in tension endured by adjacent plies promotes inter-ply slippage, which prevents wrinkling and bridging. The tension connectors 1016 may pull through the composite material 2000 when tension exceeds bearing strength of the composite material 2000, as seen in FIG. 10.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of shaping a composite material blank comprising plies, the method comprising steps of:
    positioning a plurality of clevises near tension openings in the composite material blank;

extending a plurality of clevis pins through the tension openings;
connecting the plurality of clevis pins to the plurality of clevises so that the plurality of clevises are connected to the composite material blank;
applying tension to the composite material blank via the plurality of clevises and plurality of clevis pins such that more tension is applied to wrinkle prone plies of the composite material blank than to non-wrinkle prone plies of the composite material blank as the composite material blank is caused to conform to shape-forming features of a first tool; and
shaping the composite material blank to have a bend while applying tension, wherein the wrinkle prone plies define a concave surface at the bend and the non-wrinkle prone plies define a convex surface at the bend.

2. The method of claim 1, further comprising a step of orienting the plurality of clevis pins diagonally relative to the plurality of clevises and the composite material blank.

3. The method of claim 1, wherein the plurality of clevis pins include step-down ledges.

4. The method of claim 1, wherein the plurality of clevis pins are cantilever pins and the step of extending the plurality of clevis pins through the tension openings includes extending the plurality of clevis pins only partially through the tension openings.

5. The method of claim 1, wherein the step of connecting the plurality of clevis pins to the plurality of clevises includes extending the plurality of clevis pins through clevis pin holes of the plurality of clevises.

6. The method of claim 1, wherein the step of applying tension is performed via a biasing element.

7. The method of claim 6, further comprising a step of connecting the biasing element to the plurality of clevises via a plurality of tension wires.

8. The method of claim 1, further comprising a step of moving a portion of the composite tensioning system to control the tension.

9. The method of claim 1, further comprising a step of actuating a second tool toward the first tool to conform the composite material blank to the shape-forming features of the first tool.

10. The method of claim 1, further comprising a step of inflating an inflatable bladder against the composite material blank to conform the composite material blank to the shape-forming features of the first tool.

11. The method of claim 1, further comprising a step of suspending the composite material blank over the first tool.

12. A method of shaping a composite material blank comprising plies and tension openings, the method comprising steps of:
extending a plurality of cantilever pins through the tension openings; and
applying tension to the composite material blank via the plurality of cantilever pins such that more tension is applied to wrinkle prone plies of the composite material blank than to non-wrinkle prone plies of the composite material blank as the composite material blank is caused to conform to shape-forming features of a first tool; and
shaping the composite material blank to have a bend while applying tension, wherein the wrinkle prone plies define a concave surface at the bend and the non-wrinkle prone plies define a convex surface at the bend.

13. The method of claim 12, wherein said extending the plurality of cantilever pins through the tension openings comprises extending each cantilever pin through an entire thickness of the composite material blank.

14. The method of claim 12, wherein each cantilever pin includes a neck, a head, and a distal end opposite the head.

15. The method of claim 14, further comprising attaching wires to the distal ends of the cantilever pins.

16. The method of claim 15, wherein said extending the plurality of cantilever pins through the tension openings comprises engaging the head of each cantilever pin with the composite material blank to anchor the cantilever pin in the respective tension opening.

17. The method of claim 15, wherein said applying tension comprises tensioning the wires to pull the cantilever pins via the distal ends.

18. The method of claim 17, wherein said extending the plurality of cantilever pins through the tension openings comprises locating the distal ends of the cantilever pins adjacent the wrinkle prone plies and the head of the cantilever pins adjacent the non-wrinkle prone plies.

* * * * *